(12) United States Patent
Edel et al.

(10) Patent No.: US 8,481,657 B2
(45) Date of Patent: Jul. 9, 2013

(54) INCREASED MONOMER CONVERSION IN EMULSION POLYMERIZATION

(75) Inventors: Hans A. Edel, Erdeborn (DE); Hagen Bartossek, Sachsen-anhalt (DE); Doris R. Marx, Merseburg (DE)

(73) Assignee: Styron Europe GmbH, Horgen (CH)

( * ) Notice: Subject to any disclaimer, the term of this patent is extended or adjusted under 35 U.S.C. 154(b) by 60 days.

(21) Appl. No.: 13/143,867

(22) PCT Filed: Jan. 7, 2010

(86) PCT No.: PCT/US2010/020337
§ 371 (c)(1),
(2), (4) Date: Jul. 8, 2011

(87) PCT Pub. No.: WO2010/083089
PCT Pub. Date: Jul. 22, 2010

(65) Prior Publication Data
US 2011/0269930 A1  Nov. 3, 2011

Related U.S. Application Data

(60) Provisional application No. 61/144,633, filed on Jan. 14, 2009.

(51) Int. Cl.
C08F 2/00 (2006.01)
C08F 4/28 (2006.01)
C08F 36/00 (2006.01)
C08F 12/02 (2006.01)

(52) U.S. Cl.
USPC ............ 526/64; 526/335; 526/346; 526/227; 526/211

(58) Field of Classification Search
USPC .............................. 526/64, 335, 346, 227, 211
See application file for complete search history.

(56) References Cited

U.S. PATENT DOCUMENTS

| 2,526,654 A | * | 10/1950 | Gleason et al. ............... 526/216 |
| 3,296,177 A | | 1/1967 | Haines et al. |
| 3,402,138 A | | 9/1968 | Albert et al. |
| 3,632,507 A | * | 1/1972 | Witt ............................. 210/735 |
| 5,384,372 A | | 1/1995 | Lattime |
| 6,342,559 B1 | * | 1/2002 | Takagishi ..................... 524/492 |
| 6,723,255 B2 | | 4/2004 | Buszta et al. |

FOREIGN PATENT DOCUMENTS

| CN | 1121931 A | | 5/1996 |
| CN | 1121931 A | * | 5/1996 |
| EP | 0 879 833 A1 | | 11/1998 |
| WO | WO 02/38617 A1 | | 5/2002 |

OTHER PUBLICATIONS

PCT Search Report mailed Mar. 22, 2010 for corresponding PCT Application No. PCT/US2010/020337.
Ullmann's Encyclopedia of in dustrial Chemistry Bd.13, pp. 606-607.
Karam et al., *Analysis of Swelling of Crosslinked Rubber Gel With Occlusions*, "Journal of Applied Polymer Science," vol. 30, Issue 5, May 1985, pp. 1969-1988.

* cited by examiner

*Primary Examiner* — William Cheung
(74) *Attorney, Agent, or Firm* — Brinks, Hofer, Gilson & Lione

(57) ABSTRACT

A method for increasing the monomer conversion in a redox initiated emulsion polymerization has been discovered. The method comprises adding a composition comprising an effective amount of a substituted phenol to the polymerization medium. In this manner, high monomer conversion is obtained and the product has low gel contents and a low amount or no crosslinking.

14 Claims, No Drawings

INCREASED MONOMER CONVERSION IN EMULSION POLYMERIZATION

The present patent document is a National Stage of International Application PCT/US2010/020337 filed Jan. 7, 2010, which claims the benefit of the filing date under 35 U.S.C. §119(e) of Provisional U.S. Patent Application Ser. No. 61/144,633, filed Jan. 14, 2009. The entirety of both applications is hereby incorporated by reference.

FIELD OF THE INVENTION

This invention relates to an improved process for redox initiated emulsion polymerizations which increases monomer conversion.

BACKGROUND AND SUMMARY OF THE INVENTION

Reduction/oxidation, i.e., redox, emulsion polymerizations, to form, for example, emulsified stryrene butadiene rubber, are typically conducted in cool conditions using soaps, and typically terminated by a shortstopping agent. The purpose of the short stopping agent is to make the initiator system inactive under the prevailing conditions, and thereby prevent crosslinking and/or gel formation. Processes for free radical initiated emulsion polymerization terminated by a shortstopping agent are well-known and described in great detail in the prior art. For example, WO 02/38617, U.S. Pat. Nos. 3,402,138; 3,296,177; 5,384,372; and Ullmann's Encyclopedia of Industrial Chemistry Bd. 13, 606, describe such processes for forming, for example, ethylene styrene butadiene rubber, and are each incorporated herein by reference.

There are available commercially a wide variety of shortstopping agents to be used in the aforementioned processes. For example, a widely used short stopping agent is, as described in U.S. Pat. No. 5,384,372, compositions of isopropylhydroxylamine and its salts. In U.S. Pat. No. 6,723,255, it is suggested to employ hydrophobic free radical scavengers based on phenol, nitroxide, and hydroxylamine with isopropylhydroxylamine shortstopping agent in emulsion processes of rubber latexes.

Unfortunately, the redox emulsion processes described above suffer from one or more shortcomings. For example, the processes are only capable of resulting in a monomer conversion of about 65 percent before excess crosslinking occurs or gel formation results. Of course, this means that any unreacted monomer must be recovered for recycling. This may be costly and inefficient. Moreover, if one seeks to increase the monomer conversion beyond 65 percent, then often a large amount of gel and crosslinking results, which may cause further problems, like, for example, equipment fouling.

Accordingly, it would be desirable to discover an improved process whereby higher monomer conversion could be obtained. It would further be desirable if such a process produced a product with less gels and crosslinking than conventional processes. If such a process also resulted in less fouling and corrosiveness despite the high monomer conversion, then it would be further beneficial. It would further be beneficial if such a process could reduce or eliminate the need for employing a short stop agent, monomer recycling, butadiene washing, butadiene distillation, styrene cleaning, and/or other cleaning of inert and/or retarding components.

Advantageously, inventive compositions and inventive processes have been discovered that meet many of the aforementioned needs and also have other desirable characteristics.

In one embodiment, the invention relates to a method for increasing the monomer conversion in a redox initiated emulsion polymerization. The method comprises adding a composition comprising an effective amount of a substituted phenol to the polymerization medium.

In another embodiment, the invention relates to a process for making an emulsified rubber. The process comprises (1) reacting styrene and butadiene in the presence of a soap, water, modifying agent, and an activating agent and (2) optionally terminating the reaction with a shortstopping agent. An effective amount of a substituted phenol is added to the reaction mixture of step (1) to form an emulsified styrene-butadiene polymer having a low gel content and high monomer conversion. The substituted phenol is selected from the group consisting of 2-6-di-t-butyl para-cresol; 2,6-bis(1,1-dimethylethyl)-4-methylphenol; octadecyl-3-(3,5-di-t-butyl-4-hydroxyphenyl)proprionate; benzenepropionic acid, 3,5-bis((1,1-dimethylethyl)-4-hydroxyl-$C_{13}$-$C_{15}$ alkyl ester ester; IRGANOX 1520 (2,4-Bis[(octyl-thio)methyl]-o-cresol); IRGANOX 1010 (Pentaerythrit-tetrakis[3-(3,5-di-tert-butyl-4-hydroxyphenyl)-propionat]); IRGANOX 1076 (Octadecyl-3-(3,5-di-tert-butyl-4-hydroxyphenyl)-propionate); and mixtures thereof.

In another embodiment, the invention relates to a composition comprising an emulsified rubber. The rubber comprises units derived from styrene and butadiene monomers. The composition is characterized by: (A) a monomer conversion of greater than about 85 weight percent; (B) at least substantially gel-free; and (C) at least substantially free of crosslinking.

In another embodiment, the invention relates to emulsified rubbers and/or compositions made by the aforementioned methods and processes.

In another embodiment, the invention relates to articles made from the compositions.

DETAILED DESCRIPTION OF THE INVENTION

General Definitions

"Polymer," as used herein, generally means a polymeric compound prepared by polymerizing monomers, whether of the same or a different type. The generic term "polymer" embraces the terms "homopolymer," "copolymer," "terpolymer" as well as polymers made by polymerizing four or more types of monomers.

"Composition," as used herein, generally includes a mixture of materials which comprise the composition, as well as reaction products and decomposition products formed or derived from, the ingredients or materials of the composition.

"Redox initiated" or "redox initiation", as used herein, generally includes any chemical reaction (such as an emulsion polymerization) wherein free electrons (such as those from organic radicals) start a reaction wherein one or more atoms have their oxidation state changed. Such changes involve, for example, oxidation which results in an increase in oxidation number and reduction which results in a decrease in oxidation number. The changes may result from, for example, a transfer of electrons or those reactions wherein no electron transfer occurs such as those involving covalent bonds.

"Substantially gel-free", as used herein, generally means that there are no substantial detectable amounts of gel using the analytical technique described herein. Typically, this is less than about 0.1% by weight.

"Low gel content", as used herein, generally means that the amount of detectable gel using the analytical technique described herein is typically less than about 0.3% by weight.

"Substantially free of crosslinking," as used herein, generally means that a substantial amount of the polymer has not been exposed to a crosslinking treatment and therefore doe not suffer from restricted molecular mobility which may tend to limit the extension of the polymer under loading.

"High monomer conversion," as used herein, generally means a monomer conversion of greater than about 70 weight percent or higher, based on the total weight of monomer.

Unless otherwise specified an alkyl group such as a $C_{13}$-$C_{15}$ alkyl ester may be either linear or branched.

Redox Initiated Emulsion Processes

The instant process is a redox initiated emulsion process. In general, at least one conjugated diolefin and optionally a copolymerizable olefin are polymerized in an aqueous medium. Examples of conjugated diolefin monomers include butadiene-1,3,2-chlorobutadiene-1,3, isoprene, piperylene, chloroprene, cyclobutadiene-1,3,2-phenylbutadiene, 2,3-dimethylbutadiene-1,3 and the like. Representative examples of the copolymerizable olefin monomers include aryl olefins such as styrene, vinyl naphthylene, alpha-methylstyrene, parachlorostyrene and the like; alpha-methylenecarboxylic acids and their esters, amides and nitriles such as acrylic acid, methacrylic acid, acrylonitrile, methacrylamide, and the like, and vinyl halides such as vinylidene chloride, vinyl bromide and the like.

If desired, the redox emulsion polymerization may be terminated by a shortstopping agent but such is not required. For example, if less than 100% monomer conversion is desired, then the polymerization may be terminated by the addition of a shortstopping agent such as, for example, isopropylhydroxylamine or a salt or mixture thereof such as described in WO 02/38617, incorporated herein by reference, as well as, reduction agents like sodium nitride, sulfinacid derivatives, sodium dimethyldithiocarbamates, sulfides, or NOx and its derivatives. The amount of shortstopping agent used will vary depending upon the process and shortstopping agent but is typically from about 0.01 to 2.0 phm (parts per hundred parts of monomer) with about 0.03 to about 0.2 phm being preferred. The manner by which the shortstopping agent will be added, will be in accord with conventional techniques used in rubber polymerization processes. Preferably, an aqueous solution of the short-stop will be added to the polymerization reaction mass when the desired conversion is obtained.

The process according to the present invention may be applied in a batchwise or continuous mode. For economic reasons, the process is preferably continuous; however, it is not believed to be critical to the overall invention. The process of the present invention is not dependent on any particular initiator, activator, reducing agent, complex forming agent, buffer, oxygen-combining substances, emulsifier, dispersing agent, modifier and the like.

Conventional cold or hot redox emulsion recipes may be employed with the present invention. Conventional ionic surfactants, known in the art, including, for example, sulfonate detergents and carboxylate soaps, are useful in the instant invention. The level of ionic surfactant is computed based upon the total weight of monomers charged and ranges from 1 to 30 parts by weight of ionic surfactant per 100 parts by weight of monomer (phm), with from about 1 to about 15 phm being more preferred, and from about 2 to about 10 phm being most preferred.

The process is preferably carried out in polymerizations in which the metal compounds of the redox system are completely (or almost completely) complexed; that is to say, that the polymerization is carried out in the presence of enough complexing agent that at least 90 percent of the metal compound reacts with it to form a water-soluble complex compound. These complexing agents therefore constitute part of the redox system and are already present at the beginning of the polymerization. A very suitable complexing agent is, for instance, sodium salts of ethylene diaminetetraacetic acid.

In one embodiment, the redox recipes applied in the polymerization include an initiator, for example, hydroperoxide, and an activator, which generally consists of several components (among which is the metal compound). These recipes are often varied so that other quantities of the initiator and/or of the activator are employed. The specified values can then be designated as the 100% or the 100/100 level, the desired modifications being expressed in percentages thereof, for instance 50% level or initiator/activator level=~50/50.

Activators usually comprise heavy metal (Nos. 23-29 of the Periodic Table) water soluble salts, such as ferrous sulfate, cobalt chloride, cuprous chloride, nickel sulfate and the like.

When employing the process at less than, for example, full monomer conversion, then it may be useful to polymerize at an initiator level such that upon reaching the desired conversion, the initiator is nearly or fully consumed. This may, for instance, be effectuated by choosing a low ratio between the initiator level and the activator level.

Thus, the polymerization medium often comprises a soap, water, modifier, and an activating agent. Preferably, the polymerization medium comprises one or more of the following: styrene, butadiene, water, fatty acid soap, rosin acid soap, electrolyte, chelated iron complex, sodium formaldehyde sulfoxylate, ter-dodecyl mercaptane, di-isopropylbenzene hydroperoxide, and/or p-methanehydroperoxide.

In one embodiment, the temperature of the polymerization ranges from about 0 to about 50° C., preferably from about 0 to about 25° C., more preferably from about 5 to about 20° C., more preferably from about 0 to about 15° C., more preferably about 3 to about 10° C., with a temperature range from about 4 to about 8° C. being particularly preferred. The polymerization may be conducted for any length of time, but it is preferred to be from about 4 to about 20 hours, more preferably from about 5 to about 10 hours. A chain transfer agent may be used in order to, for example, control the average molecular weight.

Increasing Monomer Conversion in Redox Emulsion Processes

A high monomer conversion of the aforementioned processes may be obtained with reduced crosslinking and gel formation by, for example, adding an effective amount of a substituted phenol to the polymerization medium. While not wishing to be bound to any theory it is believed that adding the proper substituted phenol, in the proper amount, at the proper time, acts to trap free radicals, and thereby prevent the radicals from forming gels and crosslinked products, as the reaction is allowed to continue to consume monomer and thereby result in high monomer conversion, without producing its usually attendant problems. More specifically, free radicals are often generated from free hydroperoxide by autocatalysis during the process and this often leads to crosslinking and gels. A proper amount of a proper substituted phenol acts to trap formed free radicals making it possible to continue the redox polymerization without substantial change in kinetic order, resulting in high monomer conversion.

While the substituted phenols may be employed in any of the general redox initiated emulsion processes previously described, they have found particularly usefulness when reacting a styrene monomer and a butadiene monomer to form an emulsified styrene butadiene rubber. Such processes advantageously may occur in the presence of a soap, water, modifying agent, and an activating agent.

Useful substituted phenols include any that are capable of binding with a free radical produced in the given redox emulsion processes. Typical substituted phenols are those substituted with an alkyl group such as a branched alkyl group like i-propyl or t-butyl. Particularly preferable substituted phenols are selected from the group consisting of 2-6-di-t-butyl para-cresol; 2,6-bis(1,1-dimethylethyl)-4-methylphenol; octade-cyl-3-(3,5-di-t-butyl-4-hydroxyphenyl)proprionate; benzenepropionic acid, 3,5-bis((1,1-dimethylethyl)-4-hydroxyl-$C_{13}$-$C_{15}$ alkyl ester; IRGANOX 1520 (2,4-Bis[(octyl-thio) methyl]-o-cresol); IRGANOX 1010 (Pentaerythrit-tetrakis [3-(3,5-ditert-butyl-4-hydroxyphenyl)-propionat]); IRGANOX 1076 (Octadecyl-3-(3,5-di-tert-butyl-4-hydroxyphenyl)-propionate) and mixtures thereof.

The effective amount of a desired substituted phenol varies depending upon the reactants, amounts, process conditions, and the specific substituted phenol. However, preferably the amount and type of phenol should be selected to be sufficient to bind with substantially all of the free radicals produced in a given emulsion process. In this manner a high monomer conversion may be achieved due to, for example, a substantial amount of the free radicals being bound so that they cannot participate in reactions to form gels or crosslinked products. In accordance with the present invention preferred amounts and types of substituted phenols may result in a monomer conversion of greater than about 70, preferably greater than about 75, more preferably greater than about 80, more preferably greater than about 85, more preferably greater than about 90, more preferably greater than about 95 weight percent, based on the total weight of monomer. Preferable amounts and types of substituted phenols include those that, for example, may also result in at least substantially gel-free emulsion polymer and/or polymer that is at least substantially free of crosslinking. Often effective amounts of substituted phenol may range from about 0.01 to about 5 parts, preferably from about 0.01 to about 1 parts, more preferably from about 0.02 to about 0.5 parts, of substituted phenol per 100 parts monomer. Advantageously, effective amounts of the substituted phenol typically do not have a short stop effect, i.e., it does not significantly hinder further polymerization.

The effective amount of desired substituted phenol may be added at any convenient time in the process, so long as sufficient phenol is present to prevent, or at least substantially hinder, the free radicals from participating in reactions to form gels or crosslinked products. Thus, in a continuous or batch process, the desired amount of desired substituted phenol may be added continuously or incrementally along with the monomers prior to significant polymerization. Alternatively, the desired amount of desired substituted phenol may be added incrementally, or in full, while polymerization is occurring, so long as there is a sufficient amount to prevent, or at least substantially hinder, any free radicals from participating in reactions to form gels or crosslinked products. In one embodiment, at least some of the desired effective amount of desired substituted phenol is present before the monomer conversion reaches 65 percent which is often the point at which free radicals may be formed.

The aforementioned methods often may result in a total monomer conversion which is at least about 5 percent, preferably at least about 10 percent higher, based on total monomer conversion as compared to the same process conducted without adding a composition comprising an effective amount of a substituted phenol to the emulsion during the polymerization. Thus, the monomer conversion may be preferably greater than about 85 weight percent, based on the total weight of monomer. The aforementioned products are often at least substantially free of crosslinking. This often means that, in one embodiment, the aforementioned products are often at least substantially gel-free (e.g. less than about 0.3, preferably less than about 0.2, more preferably less than about 0.1 percent by weight gel content, as determined by the method described in the examples below).

Illustrative Embodiments 1-33

1. A method for increasing the monomer conversion in a redox initiated emulsion polymerization wherein said method comprises adding a composition comprising an effective amount of a substituted phenol to the polymerization medium.

2. The method of any preceding Embodiment, wherein said emulsion polymerization comprises polymerizing a styrene monomer and a butadiene monomer to form an emulsified styrene butadiene rubber.

3. The method of any preceding Embodiment, wherein the substituted phenol is capable of binding with a free radical.

4. The method of any preceding Embodiment, wherein the substituted phenol is added during the polymerization prior to the addition of a shortstopping agent.

5. The method of any preceding Embodiment, wherein the substituted phenol is added with the monomers prior to polymerization.

6. The method of any preceding Embodiment, wherein the substituted phenol is selected from the group consisting of 2-6-di-t-butyl para-cresol; 2,6-bis(1,1-dimethylethyl)-4-methylphenol; octadecyl-3-(3,5-di-t-butyl-4-hydroxyphenyl) proprionate; benzenepropionic acid, 3,5-b is 1-dimethyl-ethyl)-4-hydroxyphenyl-$C_{13}$-$C_{15}$ alkyl ester; IRGANOX 1520 (2,4-Bis[(octyl-thio)methyl]-o-cresol); IRGANOX 1010 (Pentaerythrit-tetrakis[3-(3,5-ditert-butyl-4-hydroxyphenyl)-propionat]); IRGANOX 1076 (Octadecyl-3-(3,5-di-tert-butyl-4-hydroxyphenyl)-propionate); and mixtures thereof.

7. The method of any preceding Embodiment, wherein the effective amount of a substituted phenol is from about 0.01 to about 5 parts per 100 parts monomer.

8. The method of any preceding Embodiment, wherein the effective amount of a substituted phenol is from about 0.01 to about 1 parts per 100 parts monomer.

9. The method of any preceding Embodiment, wherein the effective amount of a substituted phenol is from about 0.02 to about 0.5 parts per 100 parts monomer.

10. The method of any preceding Embodiment, wherein the polymerization results in a monomer conversion of greater than about 85 weight percent.

11. The method of any preceding Embodiment, wherein the polymerization results in a monomer conversion of greater than about 90 weight percent.

12. The method of any preceding Embodiment, wherein the polymerization results in a monomer conversion of greater than about 95 weight percent.

13. The method of any preceding Embodiment, wherein the polymerization results in at least substantially gel-free emulsion polymer.

14. The method of any preceding Embodiment, wherein the polymerization results in a polymer that is at least substantially free of crosslinking.

15. The method of any preceding Embodiment, wherein the polymerization medium comprises a soap, water, modifier, and an activating agent.

16. The method of any preceding Embodiment, wherein the polymerization medium comprises styrene, butadiene, water, fatty acid soap, rosin acid soap, electrolyte, chelated iron complex, sodium formaldehyde sulfoxylate, ter-dodecyl mercaptane, and di-isoproplybenzene hydroperoxide.

17. The method of any preceding Embodiment, wherein the polymerization is conducted at a temperature of from about 0 to about 50° C.

18. The method of any preceding Embodiment, wherein the polymerization is conducted at a temperature of from about 3 to about 10° C.

19. The method of any preceding Embodiment, wherein the polymerization is conducted at a temperature of from about 4 to about 8° C.

20. The method of any preceding Embodiment, wherein the polymerization is conducted for from about 4 to about 20 hours.

21. The method of any preceding Embodiment, wherein the polymerization is conducted for from about 5 to about 7 hours.

22. The method of any preceding Embodiment, wherein the total monomer conversion is at least about 5 percent higher based on total monomer conversion as compared to the same process conducted without adding a composition comprising an effective amount of a substituted phenol to the emulsion during the polymerization.

23. The method of any preceding Embodiment, wherein the total monomer conversion is at least about 10 percent higher based on total monomer conversion as compared to the same process conducted without adding a composition comprising an effective amount of a substituted phenol to the emulsion during the polymerization.

24. The method of any preceding Embodiment, in which the polymerization is terminated by a shortstopping agent.

25. The method of any preceding Embodiment, in which the polymerization is not terminated by a shortstopping agent.

26. A process for making an emulsified rubber comprising:
(1) reacting styrene and butadiene in the presence of a soap, water, modifying agent, and an activating agent; and
(2) optionally terminating said reaction with a shortstopping agent; wherein an effective amount of a substituted phenol is added to the reaction mixture of step (1) to form an emulsified styrene-butadiene polymer having a low gel content and high monomer conversion and wherein the substituted phenol is selected from the group consisting of 2-6-di-t-butyl para-cresol; 2,6-bis(1,1-dimethylethyl)-4-methylphenol; octadecyl-3-(3,5-di-t-butyl-4-hydroxyphenyl)proprionate; benzenepropionic acid, 3,5-bis ((1,1-dimethylethyl)-4-hydroxyphenyl-$C_{13}$-$C_{15}$ alkyl ester ester; IRGANOX 1520 (2,4-Bis[(octyl-thio)methyl]-o-cresol); IRGANOX 1010 (Pentaerythrit-tetrakis[3-(3,5-di-tert-butyl-4-hydroxyphenyl)-propionat]); IRGANOX 1076 (Octadecyl-3-(3,5-di-tert-butyl-4-hydroxyphenyl)-propionate); and mixtures thereof.

27. A composition comprising an emulsified rubber wherein said rubber comprises units derived from styrene and butadiene monomers, and wherein said composition is characterized by:
(A) a monomer conversion of greater than about 85 weight percent;
(B) at least substantially gel-free; and
(C) at least substantially free of crosslinking.

28. The composition of Embodiment 27 wherein the polybutadiene comprises less than about 0.1 percent by weight gel content.

29. An emulsified rubber formed from the method of any of Embodiments 1-25.

30. An emulsified rubber formed from the process of Embodiment 26.

31. A composition comprising the emulsified rubber of Embodiments 28 or 29.

32. An article comprising at least one component formed from the composition of Embodiment 31.

33. The article of Embodiment 31, wherein the article is a tire.

While certain representative embodiments and details have been shown for purposes of illustrating the present invention, various modifications and changes to the process can be made without departing from the scope of the present invention.

The practice of this invention is further illustrated by reference to the following examples which are intended to be representative rather than restrictive of the scope of this invention.

All percentages are given in terms of percent by weight unless otherwise indicated.

EXAMPLES

The Examples provided are intended to assist in an understanding of the invention, and are directed to those of skill in the art. Particular species employed, particular conditions, relationships, and the like, are designed to be illustrative, and not limiting. All designations of "part" or "parts" and "%" each as will be used in the following examples, mean part or parts by weight and wt. % unless expressly noted. The term "parts" as employed in the following examples refers to parts by weight of shortstopping agent per 100 parts of monomer charged.

In the examples of the present invention the modifier employed was typically a mixture of C10-C12 mercaptan although other modifiers such as a C4-C20 mecaptan or mixture thereof may also be employed. The sulfur is preferably bonded in a tertiary position. The activating agents used in the examples were paramentanehydroperoxide or diisopropylbenzenehydroperoxide although other organic peroxides for rubber such as cumylhydroperoxide and dibenzoylperoxide may also be employed. The reduction agent used in the examples was sodium formaldehyde sulfoxylate although other reduction agents such as pyrrophospates, sodium dithionite, hydroxylamines, or sulfites may also be employed. The fatty acid used in the examples was a saturated C10-C36 fatty acid although any animal or plant originated fatty acid may be employed. Potassium salts were used as the rosin acid in the examples although rosin acid from pines, root or balsamwood, or disproportionated dehydroabietates may also be employed. The electrolyte system employed in the examples was $H_3PO_4$ in combination with NaOH to form a tri-sodium phosphate buffer although any system may be used to maintain the pH around 10. The iron complex used in the examples below was $FeSO_2$ and Chelaplex (ethylenediaminetetraacetate) although any redox system such as those based on Co, Cr, Ni etc. may be employed. The soap employed in the examples below was a standard rosin/fatty acid soap system although any be employed such as systems based on NEKAL (Naphthaleneisobutylsulfonate).

The detection of gels in the below examples was based on "Analysis of swelling of crosslinked rubber gel with occlusions", *Journal of Applied Polymer Science*, Vol. 30, Issue 5, May 1985, pp. 1969-1988 which is incorporated herein by reference. In general, the test proceeds as follows: first the sample is weighed in 0.2000±0.0001 g in step (A). The sample is put in a sack from gauze and the weight is detected in step (B). Next, the sack is put in a 150 ml flask of toluene for 24 hours. Then, the sack is removed from toluene with tweezers. For evaporation it is left for about 30 minutes in a fume hood. Then the sack is heated in an oven for 2 hours at 105° C. The weight is detected in step (C). The gel content is defined as:

$$\text{Gel content (\%)} = \frac{C - (B - A)}{A} * 100$$

A=sample input (g)
B=Sack+sample input (g)
C=Sack+sample input after drying (g)
(B−A)=Sack (g)
Sample experiment: A=0.2001 g
    B=0.6220 g
    C=0.4220 g
    Gel content (%)=0.04998

Example I

A redox initiated emulsion polymerization was carried out using a cold soap styrene butadiene polymerization with the ingredients listed on Table 1.

TABLE 1

| Ingredient | Parts per 100 parts monomer (phm) | Input as 1 kg monomer experiment |
|---|---|---|
| Styrene | 23 | 230 g |
| Butadiene | 77 | 770 g |
| Water | 215 | 2150 g |
| Fatty acid soap | 2.5 | 25 g |
| Rosin acid soap | 2.5 | 25 g |
| Total electrolyte | 0.45 | 4.5 g |
| substituted phenols | 0.01-1 | 0.1-10 g |
| Chelated iron complex | 0.01 | 0.1 g |
| Sodium formaldehyde sulfoxylate | 0.05 | 0.5 g |
| Tert. Dodecyl mercaptane | 0.14 | 1.4 g |
| di-isopropylbenzenehydroperoxide | 0.05 | 0.5 g |
| Short stop (Hydroxylamine/ isopropylhydroxylamine 1:1 weight ratio as 100% concentrated) | 0.05 | 0.5 g |

The above polymerization was carried out at 5-7° C. for 6 hours with a final monomer conversion ranging between 85 and greater than 99% based on total monomer weight. The resulting product was free of gels and crosslinking.

Example II

Under nitrogen atmosphere, at 5° C., a stirred five liter reactor was fed the following: styrene and butadiene monomers, sodium formaldehyde sulfoxylate, t-dodecylmercaptane, diisopropylbenzenehydroperoxide and a phenol (ANOX BF™ available from Great Lakes Chemical). The polymerization was initiated by adding a chelated iron complex into the mixture. The ingredients are shown in Table 2 below.

TABLE 2

| Ingredients | Parts per 100 parts monomer (phm) | Inputs as 1 kg monomer experiment |
|---|---|---|
| Styrene | 28.7 | 483.2 g |
| Butadiene | 71.3 | 1200 g |
| Water | Emulsifier | Emulsifier |
| Fatty acid soap | | |
| Rosin acid soap | 224.31 | 3775.2 g |
| Total electrolyte | 0.45 | — |
| Phenol (ANOX BF ™) | 0.029 | 0.5 g |
| Chelated iron complex | 0.01 | Solution 60 ml 1.269 g CHELAPLEX |
| Sodium formaldehyde sulfoxylate | 0.0166 | 0.344 g FeSO4*7H2O 7 g solution 40% |
| Tert. dodecyl mercaptane | 0.18 | 3.1 g |
| di-Isopropylbenzenehydroperoxide | 0.106 | 3.6 g solutions 50% |
| Short stop (Hydroxylamine/ Isopropylhydroxylamine 1:1) | | 0.5 g |

The monomer conversation was detected cyclic after each 30 minute period. The results are shown in Table 3 and the methods described immediately below Table 3.

TABLE 3

| Time [h] | Temperature [° C.] | Pressure [bar] | Monomer conversion [%] |
|---|---|---|---|
| 0.5 | 5.3 | 0.31 | 11.3 |
| 1 | 4.9 | 0.31 | 22.7 |
| 1.5 | 5.9 | 0.31 | 38.4 |
| 2 | 5.4 | 0.31 | 53.7 |
| 2.5 | 5.4 | 0.31 | 68.1 |
| 3 | 5.3 | 0.3 | 74.3 |
| 3.5 | 4.9 | 0.3 | 82.5 |
| 4 | 5.5 | 0.26 | 87.7 |
| 4.5 | 5.8 | 0.25 | 92.7 |

The monomer conversion is detected on latex amples from the test run. The latex is added to a previously weighed 250 ml flask containing about 50 ml Ethanol. The flask with the latex is weighed again and the weight of the latex is calculated from the difference. The coagulant (rubber) is isolated from the water phase over a previously weighed filter. The dried filter (30 min at 105° C.) contains the rubber amount in the given latex at the sampling moment of the polymerization. The feed was 1000 g Monomer (Styrene+Butadiene) and 2200 g Emulsifier (Water+Rosin+fatty acid soap) and the sum is therefore 3200 g. In the case of 100% conversion a solid content (rubber) of 31.25% is achieved. Thus, the monomer conversion is obtained from the solid content of the latex as shown in detail below.

| Ingredients | Parts per 100 parts monomer (phm) | Inputs as 1 kg monomer experiment |
|---|---|---|
| Styrene | 28.7 | 483.2 g |
| Butadiene | 71.3 | 1200 g |
| Water | Emulsifier | Emulsifier |
| Fatty acid soap | | |
| Rosin acid soap | 224.31 | 3775.2 g |

Factor (F) = (A + B) /A*100
Conversion = F * R/L
A = sum monomer
B = sum emulsifier
R = Rubber (coagulated dried sample from L)
L = Latex (sample)
F = ((483.2 + 1200) + 3775.2) /(483.2 + 1200) * 100
F = 324.28
Conversion = 324.28 * 1.44/12.17(%)
Conversion = 38.4% (sample from table 3)

After polymerization (with or without termination by short stop), the product was then coagulated with sulfuric acid and polyamine, isolated and dried. The resulting solid rubber weighed 1548 g and was stabilized with 0.3 phr (parts per 100 parts rubber) of an antioxidant of 2,6 di-tert-butylcatechol. Advantageously, it was generally observed, that upon addition of greater than about 0.2 phr of an appropriate substituted phenol, a further stabilization was not required.

Example III

A rubber made in a manner similar to Example II above was compared with (1) a conventional rubber with 65% monomer conversion made without a phenol addition and (2) a rubber of 85% monomer conversion made without a phenol addition. The results are shown in Table 4 and the methods described immediately below Table 4.

TABLE 4

|   | Rubber Made Similar to Example II (monomer conversion 92%) | Conventional rubber (monomer conversion 65%) | Conventional rubber with monomer conversion 85% |
|---|---|---|---|
| Conversion (%) | 92.7 | 65 | 85 |
| Styrene | 25.8 | 23.6 | 27.3 |
| Organic acid | 7.67 | 5.27 | 4.63 |
| Soap |  | 0.03 | n.b. |
| Extract |  | 5.6 | 4.29 |
| Volatile Matter | 0.13 | 0.35 | 0.36 |
| Ash | 0.59 | 0.08 | 0.33 |
| Gel | 0 | n.b. | 36.15 |
| ML 1 + 4 unmassed | 64.7 | 46.0 |  |
| Relaxed, Index unmassed | 86.6 | 92.6 |  |
| Slope unmassed | 34.46 | 0.4527 |  |
| ML 1 + 4 massed | 78 | 48.4 | 84.4 |
| Relax, Index massed |  | 92.6 | 83.4 |
| Slope massed |  | 0.4612 |  |
| Compound viscosity ML 1 + 4 | 83.9 | 75.1 | 94.8 |
| Compound viscosity Relaxation |  | 91.5 | 86.8 |
| Compound Viscosity Slope |  | 0.3941 | 0.3212 |
| Monsanto MDR 2000 E; 160° C.; 1.7 Hz; 5.5 arc |  |  |  |
| Ts1 | 2 | 3.1 | 3.2 |
| Ts2 | 3.2 | 4.3 | 4.7 |
| T10 | 2.9 | 4.2 | 4.5 |
| T50 | 6.5 | 7.1 | 7.5 |
| T90 | 13.4 | 12.7 | 13.0 |
| ML | 3 | 2.6 | 3.3 |
| MH | 19.6 | 22.2 | 20.9 |
| MH-ML | 16.6 | 19.6 | 17.5 |
| 35/145° C.; dumbbell No. 1 |  |  |  |
| Tensile Strength | 28.7 | 28.6 | 31.5 |
| Elongation at break | 495 | 509 | 484 |
| Modulus 300 | 14.8 | 14.9 | 17.4 |
| 35/145° C. specimen 12.5 mm thick |  |  |  |
| Elasticity | 49.8 | 50.2 | 49.4 |
| Hardness Shore A | 68.8 | 69.1 | 67.7 |
| Tan d −10° C. 10 Hz | 0.1977 |  | 0.3738 |
| Tan d +20° C. 10 Hz | 0.1677 |  | 0.1900 |
| Tan d −70° C. 10 Hz | 0.1199 |  | 0.13177 |

Compounds and vulcanisates were prepared by combining and compounding the constituents listed below using a lab mill. Recipe is according to ASTM D 3185-1 A.

| Compounding | Amount (phr) |
|---|---|
| Elastomeric polymer Example (styrene butadiene copolymer) | 100 |
| IRB 7 (international ref. carbon black, Sid Richardson) | 50 |
| Stearic acid | 1.0 |
| Zinc oxide | 3.0 |
| Sulfur | 1.75 |
| TBBS (N-ter.-butyl-2-benzothiazylsulfenamid; Vulcacit NZ Lanxess AG) | 1.0 |

Mooney viscosity was measured according to ASTM D 1646 with a preheating time of 1 minute and a rotor operation time of 4 minutes at a temperature of 100° C. [ML1+4(100° C.)].

Tensile strength, elongation at break and modulus at 300% elongation (Modulus 300) were measured according to ASTM D 412 on a Zwick Z010.

Heat build up (HBU) was measured according to ASTM D 623, method A, on a Doli 'Goodrich'-Flexometer.

Tan δ (60° C.) was measured using the dynamic spectrometer Eplexor 150N manufactured by Gabo Qualimeter Testanlagen GmbH (Germany) applying a compression dynamic strain of 0.2% at a frequency of 2 Hz at 60° C. The smaller the index, the lower is the rolling resistance (lower=better). Tan δ (0° C.) was measured using the same equipment and load conditions at 0° C. The larger the index, the better the wet skid resistance (higher=better).

DIN abrasion was measured according to DIN 53516 (1987-06-01). The larger the index, the lower the wear resistance is (lower=better).

Measurement of un-vulcanized rheological properties according 5 to ASTM D 5289 using a rotor-less shear rheometer (MDR 2000 E) to measure Scorch Time (Ts) and Time to Cure (T). The "T 50" and "T 90" are the respective times required to achieve 50% and 90% conversion of the vulcanization reaction. The "Ts 1" and "Ts 2" are the respective times required to increase the torque by 1 dNm or 2 dNm above the respective torque minimum (ML) during vulcanization.

The rubber made in a manner similar to Example II was advantageously free of gel and crosslinking.

We claim:

1. A method for increasing the monomer conversion in a redox initiated emulsion polymerization wherein said method comprises adding a composition comprising an effective amount of a substituted phenol to the polymerization medium, wherein the substituted phenol is selected from the group consisting of 2-6-di-t-butyl para-cresol; 2,6-bis(1,1-dimethylethyl)-4-methylphenol; octadecyl-3-(3,5-di-t-butyl-4-hydroxyphenyl)proprionate; benzenepropionic acid, 3,5-bis((1,1-dimethylphenyl)-4hydroxyphenyl-$C_{13}$-$C_{15}$ alkyl ester; IRGANOX 1520 (2,4-Bis[(octyl-thio)methyl]-o-cresol); IRGANOX 1010 (Pentaerythrittetrakis[3-(3,5-ditert-butyl-4-hydroxyphenyl)-propionate); IRGANOX 1076 (Octadecyl-3-(3,5-di-tert-butyl-4-hydroxyphenyl)-propionate]); and mixtures thereof.

2. The method of claim 1, wherein said emulsion polymerization comprises polymerizing a styrene monomer and a butadiene monomer to form an emulsified styrene butadiene rubber.

3. The method of claim 1, wherein the substituted phenol is capable of binding with a free radical and is added prior to or during the polymerization prior to the addition of a shortstopping agent.

4. The method of claim 1, wherein the effective amount of a substituted phenol is from 0.01 to 5 parts per 100 parts monomer.

5. The method of claim 1, wherein the polymerization results in a monomer conversion of greater than 85 weight percent.

6. The method of claim 1, wherein the polymerization results in at least substantially gel-free emulsion polymer with less than 0.1% by weight gel.

7. The method of claim 1, wherein the polymerization results in a polymer that is free of crosslinking.

8. The method of claim 1, wherein the polymerization medium comprises a soap, water, modifier, and an activating agent.

9. The method of claim 1, wherein the polymerization is conducted at a temperature of from 0 to 50° C.

10. The method of claim 1, wherein the polymerization is conducted for from 4 to 20 hours.

11. The method of claim 1, wherein the total monomer conversion is at least 5 percent higher based on total monomer conversion as compared to the same process conducted without adding a composition comprising an effective amount of a substituted phenol to the emulsion during the polymerization.

12. A process for making an emulsified rubber comprising:
(1) reacting styrene and butadiene in the presence of a soap, water, modifying agent, and an activating agent; and
(2) optionally terminating said reaction with a shortstopping agent; wherein an effective amount of a substituted phenol is added to the reaction mixture of step (1) to form an emulsified styrene-butadiene polymer having a low gel content and high monomer conversion and wherein the substituted phenol is selected from the group consisting of 2-6-di-t-butyl para-cresol; 2,6-bis(1,1-dimethylethyl)-4-methylphenol; octadecyl-3-(3,5-di-t-butyl-4-hydroxyphenyl)proprionate; benzenepropionic acid, 3,5-bis((1,1-dimethylphenyl)-4-hydroxyphenyl-$C_{13}$-$C_{15}$ alkyl ester; IRGANOX 1520(2,4-Bis[(octyl-thio)methyl]-o-cresol); IRGANOX 1010 (Pentaerythrit-tetrakis[3-(3,5-ditert-butyl-4-hydroxyphenyl)propionate]); IRGANOX 1076 (Octadecyl-3-(3,5-di-tert-butyl-4-hydroxyphenyl)-propionate); and mixtures thereof.

13. The process of claim 12 wherein the polymerization results in a monomer conversion of greater than 90 weight percent.

14. The process of claim 12 wherein the polymerization results in a monomer conversion of greater than 95 weight percent.

* * * * *